(No Model.)
C. RAUHE.
DENTAL DRILL.
No. 477,225. Patented June 21, 1892.
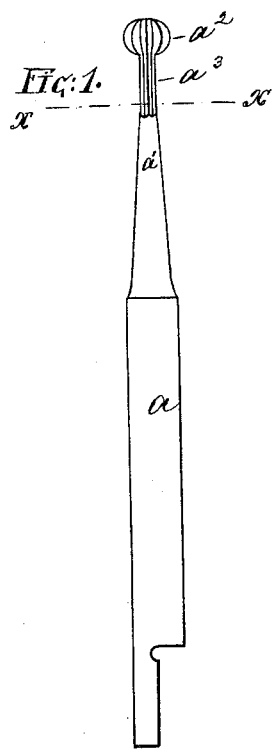

UNITED STATES PATENT OFFICE.

CARL RAUHE, OF DUSSELDORF, GERMANY.

DENTAL DRILL.

SPECIFICATION forming part of Letters Patent No. 477,225, dated June 21, 1892.

Application filed March 24, 1892. Serial No. 426,192. (No model.)

*To all whom it may concern:*

Be it known that I, CARL RAUHE, a subject of the Emperor of Germany, residing at Dusseldorf, Germany, have invented certain new and useful Improvements in Dental Drills, of which the following is a specification.

This invention relates to a dental drill having a cutter of peculiar construction and by which a countersunk cavity may be formed.

It consists in the various features of improvement more fully pointed out in the claim.

In the accompanying drawings, Figure 1 is an elevation of my improved dental drill; and Fig. 2, a cross-section on line $x\ x$, Fig. 1.

The letter $a$ represents a dental drill having a contracted neck $a'$ and a laterally-projecting cutter-head $a^2$. Upon the neck $a'$, adjacent to the head $a^2$, I form an additional cutting-surface $a^3$, preferably by corrugating said neck in line with the axis of the drill.

In use the drill is first driven into the tooth until the head $a^2$ is embedded. By next moving the drill in a lateral direction the surface $a^3$ will attack the side of the tooth near the surface, while the head $a^2$ will attack the tooth near the root. Thus a countersunk cavity can be formed—*i. e.*, a cavity wider at the base than at the mouth—which is a very desirable attainment in dentistry.

What I claim is—

A dental drill provided with a contracted cutting-neck and a laterally-projecting cutter-head, substantially as specified.

In testimony whereof I have signed this specification in the presence of two subscribing witnesses.

CARL RAUHE.

Witnesses:
HEINRICH SCHREY,
FRITZ KIRSTEN.